(12) United States Patent
Kundorf

(10) Patent No.: US 6,553,217 B1
(45) Date of Patent: Apr. 22, 2003

(54) MOBILE COMMUNICATION SYSTEM FOR CALL CHARGING AND CORRESPONDING MOBILE STATION

(75) Inventor: Andreas Kundorf, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/485,891

(22) PCT Filed: Aug. 18, 1998

(86) PCT No.: PCT/DE98/02401

§ 371 (c)(1),
(2), (4) Date: Feb. 17, 2000

(87) PCT Pub. No.: WO99/09763

PCT Pub. Date: Feb. 25, 1999

(30) Foreign Application Priority Data

Aug. 19, 1997 (DE) .......................................... 197 35 950

(51) Int. Cl.$^7$ ............................................. H04M 11/00
(52) U.S. Cl. ......................... 455/406; 455/407; 455/408
(58) Field of Search ................................ 455/406, 407, 455/408, 405, 409, 414

(56) References Cited

U.S. PATENT DOCUMENTS 6,018,652 A * 1/2000 Frager et al. ................ 455/406
6,324,404 B1 * 11/2001 Dennison et al. ........... 455/456
6,397,055 B1 * 5/2002 McHenry et al. ........... 455/408

* cited by examiner

Primary Examiner—Daniel Hunter
Assistant Examiner—Thuan T. Nguyen
(74) Attorney, Agent, or Firm—Morrison & Foerster LLP (57) ABSTRACT

One or more preferred call numbers are defined and managed for mobile subscribers. A destination number dialed with the call is compared to the preferred call numbers for the mobile subscriber. When the destination call number is identical to a preferred call number, the call charges are determined by a charging device in the mobile network in a different manner than the usual charge. The storing of the preferred call numbers can occur at the mobile station side in a mobile station or at the network side. Based on the subscriber-specific stipulation of preferred call numbers, mobile subscribers have the ability to select and define specific call destinations which are charged differently than other calls, for instance according to a more favorable fee schedule. This increases the flexibility of the mobile subscribers and network operators with respect to the scheduling of calling rates.

23 Claims, 6 Drawing Sheets

MOBILE COMMUNICATION SYSTEM FOR CALL CHARGING AND CORRESPONDING MOBILE STATION

BACKGROUND OF THE INVENTION

The present invention relates to a mobile communication system for charging calls in a mobile radio network having a cellular structure based on radio cells and, more particularly, charging calls that are determined as preferred calls in a manner different than usual charging of numbers called that are not preferred.

It is generally known that mobile radio networks such as those according to the GSM standard (Global System for Mobile Communication) have a cellular network structure consisting of a plurality of radio cells as the smallest radio coverage areas. Several radio cells can be combined into intermediate regions, whose size can also be variably specified by the network operator dependent on the requirements presented by traffic density and flow, population density and subscriber mobility. The network operator specifies a radio network plan containing the structure, arrangement and number of the radio cells and intermediate regions. It is also known that a mobile radio network having a cellular network structure comprises radio equipment for sending and receiving signaling information and payload information to and from the mobile stations as well as switching equipment for switching through signaling connections and payload connections. Storage equipment in the radio network contains the subscriber data of the registered mobile subscribers who want to transmit and receive calls. At least one charging device is arranged in the mobile radio network for determining the respective charge for a call. The changing device records the call-related data record of the A subscriber (calling subscriber) and the B subscriber (called subscriber)—and computes the call charge dependent on these data records. Because of the growing number of deregulated communication networks, a high demand for mobility and reduced prices for telecommunication services, in addition to high costs for preparing the last mile for a permanent network connection of a wirebound subscriber, it is desirable in a mobile communication system, to have a fee structure for charging calls that is more flexible for the subscriber. This would make the wirebound subscribers, who usually have lower charges than mobile subscribers, more willing to change to mobile communication.

The international patent application WO 97/23081 teaches a method and a system for controlling calls both for subscribers of a stationary network and for subscribers of a mobile radio network exclusively by coupling with equipment (e.g. SSP,SCP,SDF) of an intelligent network (IN). The use of IN equipment enables the known system to put a special charge into effect for a limited number of network subscribers without substantial modifications of the telecommunication network. The intelligent network is thus an unconditional requirement for realizing this solution described in this reference. Outside the mobile radio network (MCN) and, thus, not in a storage means of the mobile radio network, the intelligent network stores several number pairs to which a common call number is unambiguously allocated. A subscriber-specific IN storage means is provided as storage means for accepting these numbers.

SUMMARY OF THE INVENTION

Therefore, there is a need to create a mobile communication system by which the charging of calls in the mobile radio network can be better adapted to the needs and desires of mobile subscribers with respect to a more flexible fee structure. Beyond this, a mobile station that supports the more flexible fee structure is set forth.

This need is met by the features of the present invention including a mobile communication system for charging calls that can be sent and received by mobile stations of mobile subscribers in a mobile radio network. The mobile communication system includes radio equipment configured for sending and receiving at least one of signaling and payload information to and from the mobile stations. Additionally, switching equipment is provided that is configured to switch at least one of signaling and payload connections between the network and the mobile stations. Storage equipment is provided to store subscriber data of the mobile subscriber and a charging device records call related data records and calculates respective call charges dependent on the data records. The system also includes defining and managing one or more preferred call numbers for each of the mobile subscribers and allocating an item of control information to a destination call number that is dialed with a call in order to denote that the destination call number is a preferred call number. The destination call number is then compared to one or more of the preferred call numbers defined for the mobile subscriber and when the destination call number is identical to a preferred call number, call charges are determined by the charging device in a prescribed manner different from normal call charges.

According to a further aspect of the invention, a mobile station for sending and receiving calls of mobile subscribers in a mobile radio network having a cellular structure that is based on radio cells includes a control management unit configured for respectively defining and managing one or more preferred call numbers for each of the mobile subscribers. Additionally, the mobile station includes a comparison unit configured to compare a destination call number that has dialed a particular call to the preferred call numbers, the destination call number having an item of control information allocated thereto to denote that the destination call number is a preferred call number. A receiving/transmitting unit is provided that is configured to signal the item of control information marking the present subject preferred call number to the mobile radio network together with the destination call number whenever the destination call number is identical to the preferred call number. Hence, call charges within the mobile radio network are calculated by the charging device in a prescribed manner different from normal call charges when the destination call number is identical to the preferred call number.

According to another aspect of the invention, one or more preferred call numbers for the mobile subscribers are defined and managed. A destination call number dialed with the call, to which an item of control information is allocated marking the fact that this is a matter of a preferred call number, is compared to the preferred call numbers defined for the mobile subscriber; and when the destination call number is identical to a preferred number, the call charges are determined by the charging device in a different way than the usual charging. Based on the subscriber-specific specification of preferred call numbers, every mobile subscriber has the possibility, in principle, to select and define specific call destinations that are charged differently than other calls such as charging based on a more favorable fee schedule, for example. This increases the flexibility of the mobile subscribers and of the network operators in terms of scheduling calling rates. Furthermore, the invention increases the readiness of the subscribers to change to mobile communication.

The network operator and service provider can offer the mobile subscribers more flexibility in the fee structure through the preferred numbers and can, thus, attain a graduated fee structure.

According to another development of the invention, the preferred call numbers are stored either at the mobile station or at the network side. At the network side, it is possible to distinguish between storing the preferred numbers as subscriber data in at least one subscriber database for the mobile radio network and storing the preferred numbers in at least one subscriber database of a service control point of an intelligent network. An advantage of storing at the mobile station side is that the mobile subscriber can modify, add, delete and retrieve the preferred call numbers himself, such as via a subscriber-controlled input. Given storage at the network side, the preferred numbers are managed and controlled by the operator of the mobile radio network or by the operator of the intelligent network. The preferred numbers can also be influenced via a subscribers's own input when stored at the network side.

It has proven advantageous to store the preferred call numbers at the mobile station side in the subscriber identity module (SIM). A memory entry is preferably formed by the preferred call number and at least one pertaining call destination.

It is also advantageous when the memory entry comprises a short code marking the preferred call number and also comprises the name of the called subscriber as call destination, which corresponds, in a way, to a telephone book in the mobile station.

The mobile radio network is informed of the presence of a preferred call number in that the control information marking the presence of a preferred call number is signaled together with the destination number from the mobile station to the mobile radio network, which prompts a subscriber-specific charging of the call based on the information received.

It is advantageous for the mobile subscriber when information that indicates at least the subscriber-specific charging of the call is made available by the mobile network is signaled to the mobile station, and is displayed to the subscriber by the mobile station.

According to another development of the invention, the preferred call numbers can also be stored at the network side in the charging device and the presence of a preferred number can be first taken into consideration only in the linking of the data records for determining the call charge.

The mobile station for supporting the flexible charging comprises means by which one or more preferred call numbers are respectively defined and managed for the mobile subscribers. A destination number dialed with the call, to which an item of control information is allocated that denotes this is a matter of a preferred call number, is compared to the preferred call numbers defined for the mobile subscriber. If the destination call number is identical to a preferred call number, an item of information marking the presence of a preferred call number is signaled to the mobile radio network together with the destination number, so that at the network side the call charges are calculated by the charging device in a different manner than usual based on the information received.

Additional advantages and novel features of the invention will be set forth, in part, in the description that follows and, in part, will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Details of the invention are given in exemplifying embodiments that are illustrated in the drawings. Specifically shown are.

DETAILED DESCRIPTION OF THE PREFERRED EMBODIMENTS

Figure 1:
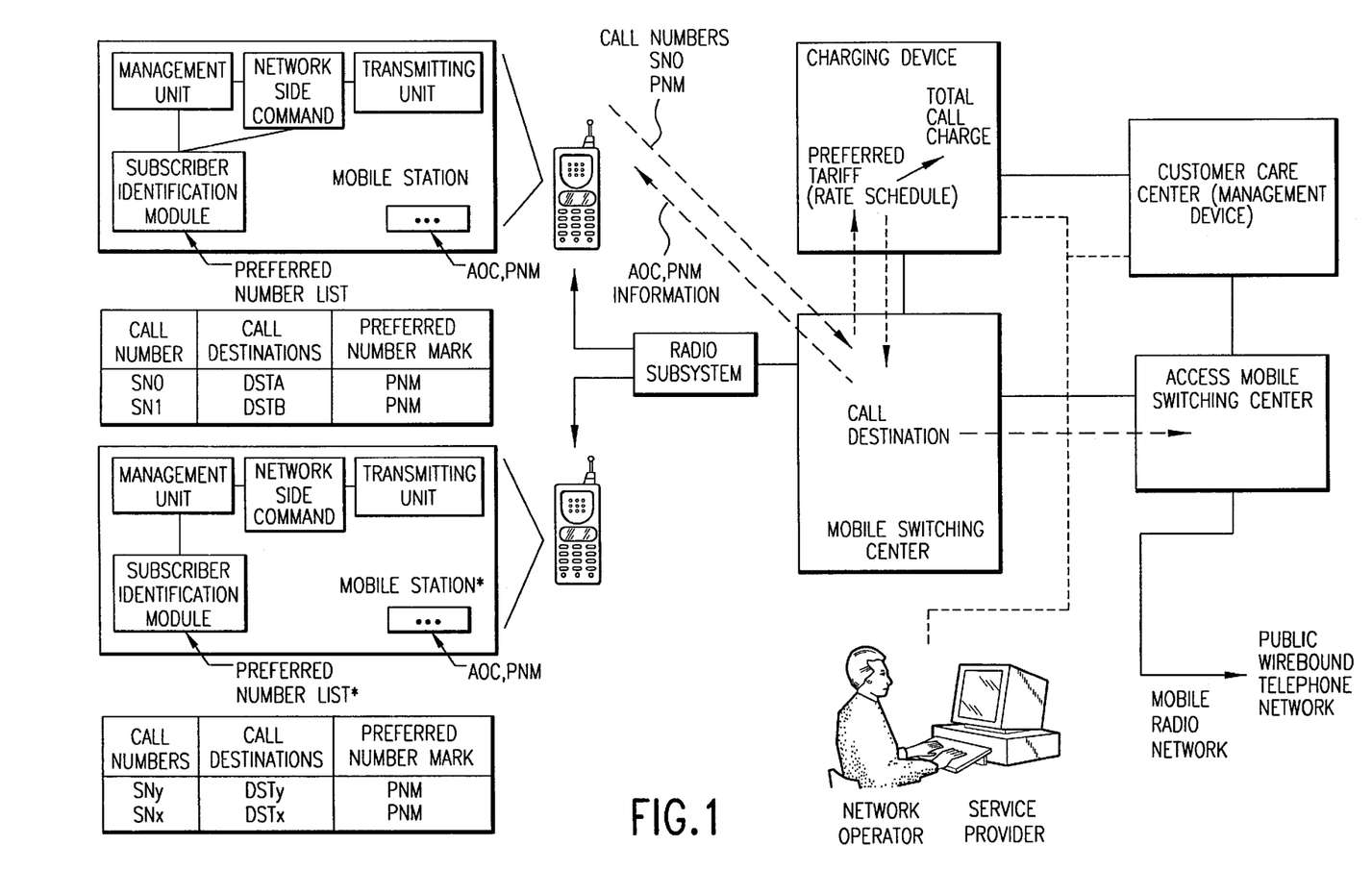
FIGS. 1 and 2 illustrate block circuit diagrams of a mobile communication system having mobile stations and having network equipment of a mobile radio network for charging calls of mobile subscribers upon utilization of preferred call numbers that are stored at the mobile station side.

FIG. 1 depicts the block circuit diagram of a mobile communication system having mobile stations MS and MS* and network equipment of a mobile radio network for charging calls that can be sent and received by the mobile subscribers that actuate the mobile stations MS and MS*. The two mobile stations MS and MS* of mobile subscribers are connected to the equipment of the mobile radio network in a wireless manner via a radio interface. The mobile radio network, for instance a mobile radio network according to the GSM standard, comprises a radio subsystem BSS at the radio interface which has at its disposal base transmit-receive stations in the individual radio cells of the cellular mobile radio network as well as base station controls that are connected to the receiving stations. The receiving stations serve for sending/receiving signaling information or payload information that is wirelessly exchanged between the mobile stations and the network via radio signals. The base station controls take over the control functions for the radio transmission, for instance the allocation of transmission channels in which the signaling information and the payload information are contained. However, the invention is also applicable to other mobile communication systems that do not operate according to the GSM standard.

A switching subsystem is connected to the radio subsystem BSS that typically comprises several switching means, for instance mobile switching centers MSC for switching through the signaling connections and/or the payload connections to and from the mobile stations. In the switching subsystem, storage means are also arranged for storing the subscriber data of the mobile subscribers registered in the mobile radio network (e.g., at least one home register and one or more visitor registers). The subscriber data of a mobile subscriber are permanently entered in the home register that is responsible for said subscriber for the duration of the subscriber's registration in the network, whereas the subscriber data of the mobile subscriber are only temporarily entered in a visitor register for the duration of his stay in the coverage area of an pertaining mobile switching center MSC. In the present example, an access mobile switching center GMSC, which forms the connection at the interface from the mobile radio network to another communication network, such as to the public wirebound telephone network PSTN or to another mobile radio network PLMN, is connected to the mobile switching center MSC. It is assumed that the mobile switching center MSC is responsible for the calls by which the mobile stations MS and MS* are affected. It is also assumed that the call destination (the called B subscriber) lies outside in another network, so that the call connection leads from the mobile switching center MSC to the access mobile switching center GMSC, and from there into the other network.

A charging device BC is connected to every mobile switching center MSC, which records the call-related data records of the calling A subscriber (here the mobile subscriber who actuates the mobile station MS) and of the called B subscriber, and which determines the respective call charge by linking the data records (call data records) at the A and B sides in consideration of a specified fee schedule. The respective mobile switching center MSC comprises at least one zone/charge table for evaluating the call charges for an online transmission and displaying the charges at the mobile station MS, MS* we which thus represents a functional image of the charging device BC with respect to online charging. A management device CCC (Customer Care Center) is connected to the charging device BC, which center manages the charging device BC, on one hand, and receives inputs from a network operator OP or a service provider SP via a separate interface, on the other hand. The network operator OP or service provider SP also has access to the charging device BC in order to be able to implement, change or replace normal and special calling rate schedules.

One or more preferred call numbers SN0,SN1 and SNy, SNx for the respective mobile subscribers are defined and managed in the mobile stations MS and MS* . They are preferably stored in the subscriber identification module SIM and can be compared with respect to identicalness to every destination call number of the B subscriber that is dialed by the A subscriber. The reason for the comparison is to recognize whether a preferred call number is present with the aid of which the charging of the call at the network side is accomplished differently from normal charging. An essential measure of the network consists in the use of a lower calling rate schedule for charging all preferred call numbers. A further graduating of the rate schedules by the mobile radio network (i.e., essentially by the charging device BC) for a select part of the preferred call numbers is also possible. The mobile subscriber thus gains the ability to define a set of destination call numbers (of B subscribers) as preferred call numbers that are subject at the network side to a different—and unique—charge structure. In the simplest case, the management of the preferred call numbers—modifying, adding, deleting, interrogating—can be effectuated by a subscriber-controlled input (subscriber controlled input) on the part of the mobile subscriber, which is potentially chargeable.

In addition, the optical/acoustical displaying of at least an item of information that a subscriber-specific charging is in force and/or the displaying of accruing calling charges is also provided, since the mobile radio network sends out corresponding signaling information to the mobile station continuously.

In the present example, two entries are respectively made in a number list PNL and PNL* (Preferred Number List) in every mobile station MS and MS*. Each entry by comprises at least one preferred call number and one corresponding call destination. In the simplest case the preferred call number consists of the destination number, to which an identifier is allocated indicating that this is a matter of a preferred call number. This identifier is the mark PNM (Preferred Number Mark), which can be used uniformly for all call numbers, being set in the defining process and reset again in the deleting process. The first entry in the number list PNL of the mobile station MS thus consists of the destination call number SN0, the corresponding call destination DSTA, and the identifier PNM. The second entry comprises only the destination call number SN1 and a corresponding call destination DSTB as preferred call number, since the marker PNM is set the same as the first entry. Each memory entry can also contain a short code for marking the preferred call numbers SN0,SN1 as well as the name of the called subscriber as call destination DSTA, DSTB, so that the data can be retrieved at the mobile station side like a telephone book. Similarly, in the mobile station MS* there is a number list PNL*, whose first entry contains the preferred call number SNy with a corresponding call destination DSTy and marker PNM and whose second entry comprises the preferred call number SNx with corresponding call destination DSTx and marker PNM.

It is assumed that the mobile subscriber who operates the mobile station MS initiates the outgoing call and dials the destination call number of the called B subscriber, who may be another mobile subscriber, but also could be a wirebound subscriber. When the comparison produces agreement of the dialed call number with one of the stored preferred call numbers SN0 and SN1, then there occurs a subscriber-specific charging of the call by the charging device BC. In the present example, the mobile subscriber dials the call number SN0, which represents one of the preferred call numbers. The mobile station MS,—being representative of all mobile stations,—comprises a control and management unit ADM for defining and managing the preferred call numbers SN0,SN1 for the mobile subscribers. Beyond this, it has a comparing means COM at its disposal for comparing the destination call number dialed with the call to the preferred call numbers SN0,SN1 that are defined for the mobile subscriber and read out of the SIM module. Because of the identicalness of the destination call number SN0 to one of the two preferred call numbers SN0, SN1, the mobile station MS sends the call number SN0 together with the marker PNM via its receiving/transmitting unit TRX in a signaling message via the radio subsystem BSS to the responsible mobile switching center MSC, which reads the presence of a preferred call number in the incoming marker PNM. This signals the charging device BC that this call should be charged differently than usual. The different treatment consists, for example, following a lower rate schedule PTAR (Preferred Tariff) in the charging device BC and in the mobile switching center MSC, for online charging, the charge being otherwise calculated with the aid of the recorded data record in a known fashion.

A call connection is setup based on the destination number that specifies the call destination DSTA from the mobile switching center MSC to the access mobile switching center GMSC, since subscriber B is a subscriber of the other communication network PLMN/PSTN. Ultimately, at the end of the call there results a total call charge AMOU, which is charged to the mobile subscriber. The charging device BC signals the separate rate schedule PTAR or at least an item of information containing an indication of the preferred charge back to the mobile switching center MSC in advance—(i.e., potentially prior to the establishing of the connection or shortly thereafter). Information AOC (Advice of Charge) relating to the charge is continuously reported by the mobile switching center MSC to the mobile station MS via the radio subsystem BSS, the mobile station MS computing the total charge from the incoming information and displaying it to the subscriber in the display, preferably optically. An acknowledgment that signals from the network to the mobile station the presence of preferred handling in terms of charging is also possible. Here, it is possible to send back the identifier PNM for confirmation.

Figure 2:
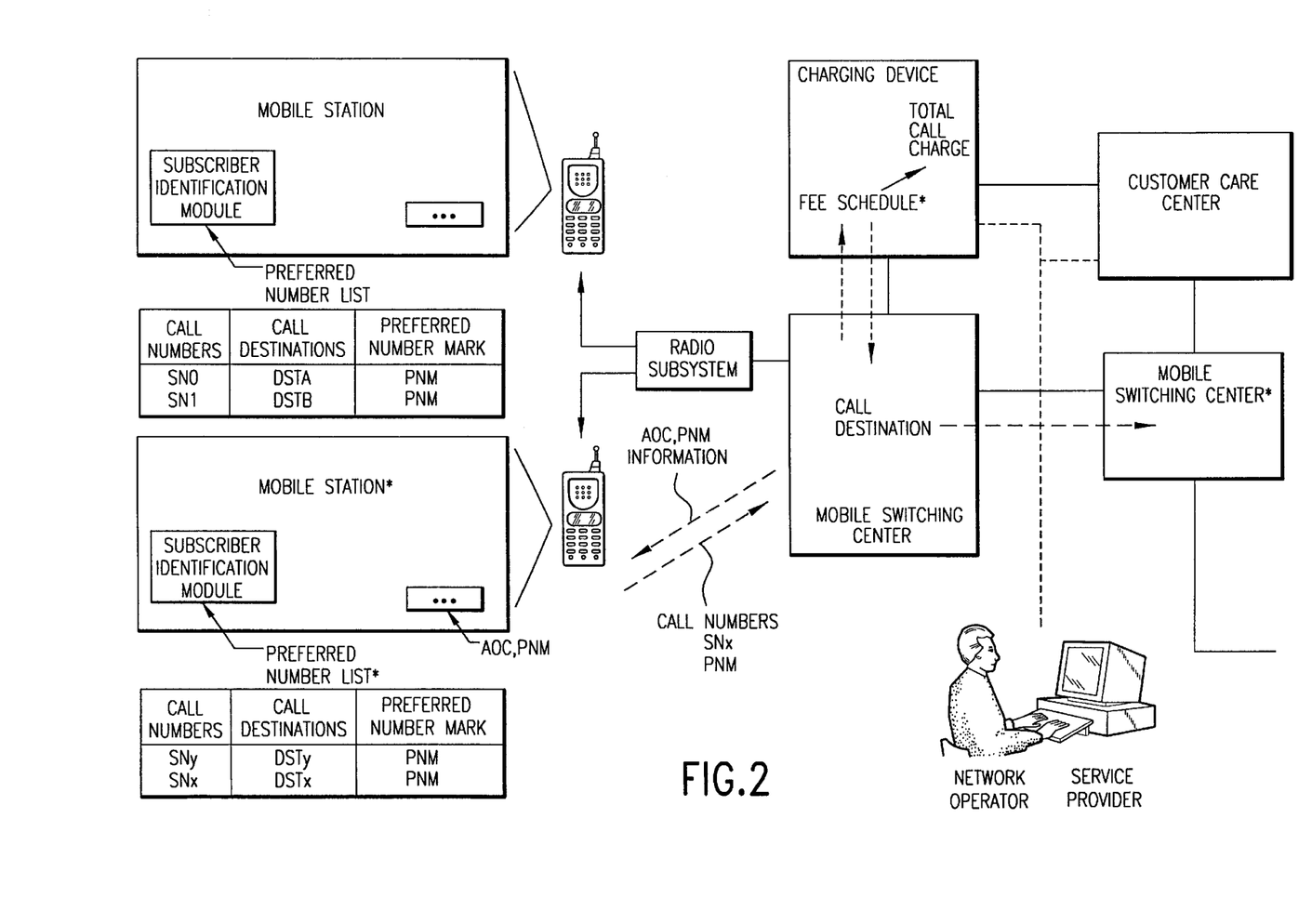

In discussion to FIG. 1, FIG. 2 illustrates the signaling of the information between the mobile station MS* and the mobile radio network when the call was initiated by a mobile subscriber who operates the mobile station MS*. The destination call number is the preferred call number SNx, which is sent out with the marker PNM in the direction of the network. The mobile switching center MSC registers the marker and instructs the charging device BC to use a preferred rate schedule PTAR to compute the call charge. With the dialed call number, a call connection is set up to the call destination DSTx that, in the present example, belongs to a mobile B subscriber and lies in a coverage area of another mobile switching center MSC* of the same mobile radio network. An acknowledgment signaling of the information AOC can be accomplished between network and mobile station MS*, analogous to the example in FIG. 1, so that the mobile subscriber is informed about the separately scheduled rate for his call.

Figure 3:
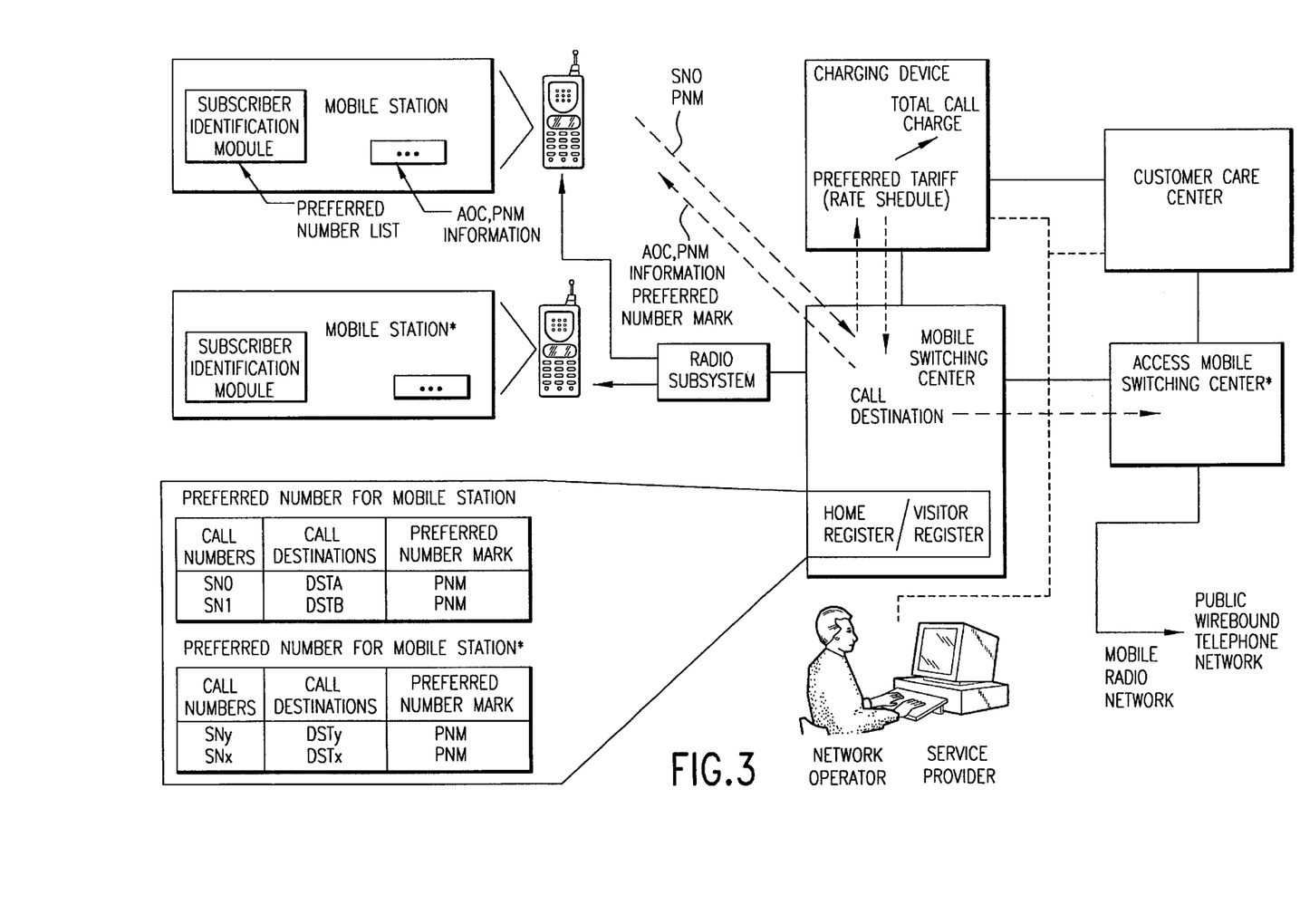
FIG. 3 illustrates the block circuit diagram of the mobile communication system for charging calls, given storing of the preferred call numbers in a subscriber database at the network side.

Alternative to the illustrations in FIGS. 1 and 2, FIG. 3 illustrates that it is possible to store the number lists PNL and PNL* for the mobile stations MS and MS* at the network side. The storage location is a subscriber database, preferably the home register HLR or a visitor register VLR, in the mobile radio network. The entries for the mobile subscribers are the same as in FIG. 1 and FIG. 2; (i.e., the destination call numbers SN0, SN1 and SNy, SNx are declared preferred call numbers with the aid of the respectively set marker PNM). The storing of the marker PNM can be forgone when all destination call numbers SN0, SN1 and SNy, SNx that are declared preferred call numbers are contained in a separate table. One possible option is to store the call destinations DSTA . . . DSTx that signify the names of the called subscribers at the network side. Taking the example from FIG. 1, the destination call number SN0 of the B subscriber that is inputted via the mobile station MS is signaled to the mobile switching center MSC. This interrogates the subscriber data of the calling A subscriber as to whether a preferred call number is present that is identical to the destination call number and receives a corresponding response message from either the home register HLR or a corresponding visitor register VLR. Since in the example the destination call number SN0 was defined as a preferred call number and stored at the network side, the mobile switching center MSC can instruct the charging device BC to use the preferred rate schedule PTAR to calculate the call charge. With the dialed call number, the call connection is set up to the call destination DSTA of the wirebound subscriber, which is situated in the coverage area of the other network in this example. An acknowledgment signaling of the information AOC can likewise occur between the network and mobile station MS, analogous to the example of FIG. 1, so that the mobile subscriber is informed at least about the separately scheduled rate of his call or, additionally, about the accruing charges.

The number lists PNL and PNL* stored at the network side in the subscriber database(s) can be managed and controlled—(i.e., modified, expanded, deleted or interrogated)—either by the mobile subscriber via the subscriber-controlled input or by the network operator OP or service provider SP via a separate interface to the charging device BC or to the management facility CCC.

Figure 4:
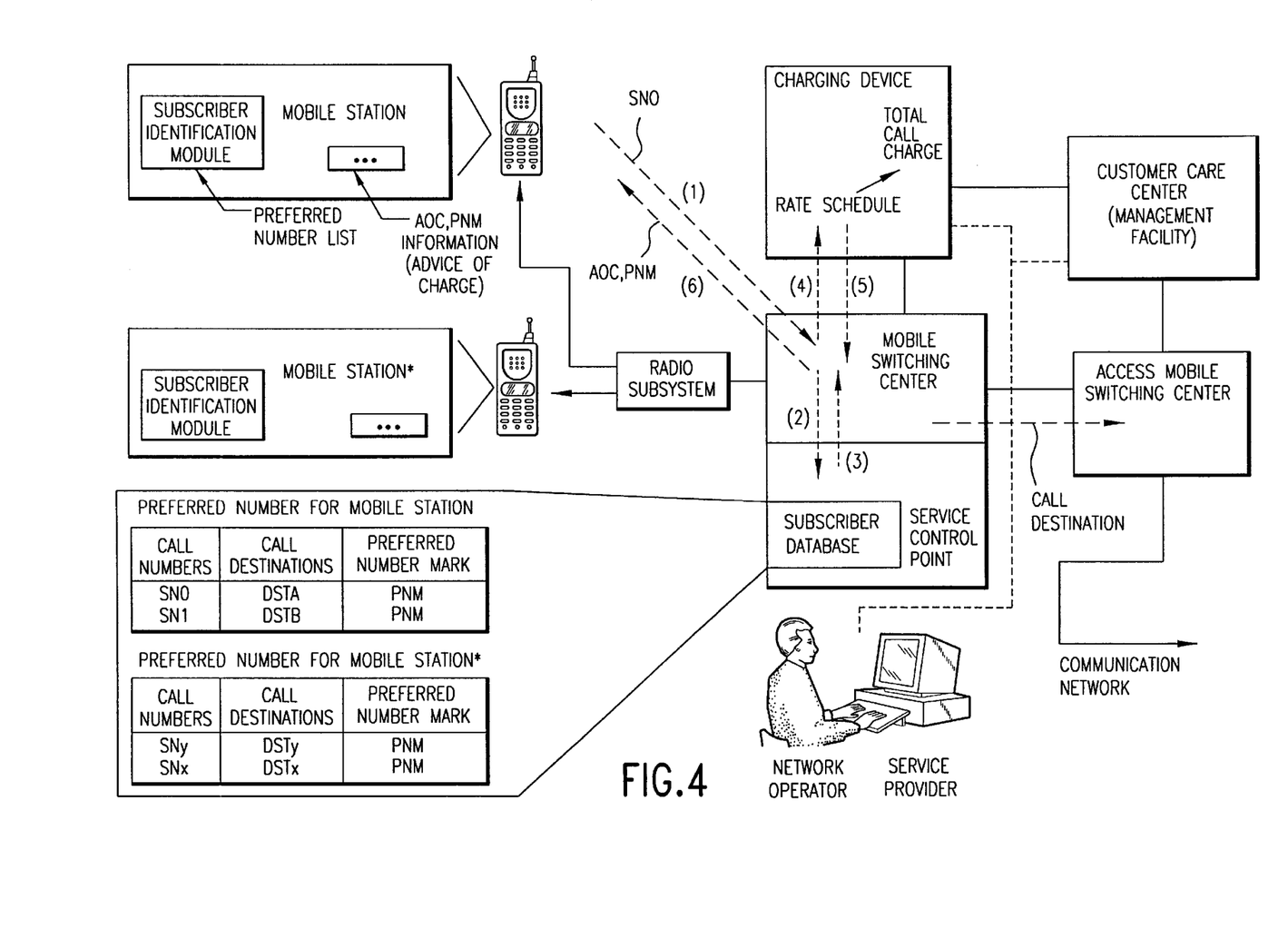
FIG. 4 illustrates the block circuit diagram of the mobile communication system for charging calls, given storing of the preferred call numbers in a service control point at the network side.

In distinction with FIG. 3, FIG. 4 depicts the block wiring diagram of a mobile communication system in which an alternative possibility exists to store the number lists PNL and PNL* for the mobile stations MS and MS* at the network side in a service control point SCP of an intelligent network (IN). The flexible charge structure can thus also be achieved by defining and managing the preferred call numbers upon linking the IN function, which provides for the execution of intelligent network functions independent of the network structure of the mobile radio network. The storage location is a subscriber database IND in the service control point SCP. The entries for the mobile subscribers are the same as in FIG. 3; (i.e., the destination call numbers SN0, SN1 and SNy, SNx are declared preferred call numbers with the aid of the respectively set marker PNM or are stored in a preferred call number table, as such). The call destinations DSTA . . . DSTx that signify the names of the called subscribers are also optionally stored at the network side.

Taking the example of FIG. 3, the destination call number SN0 of the B subscriber that is inputted via the mobile station MS is signaled to the mobile switching center MSC (1). This branches in the call setup to the service control point SCP and interrogates the subscriber database IND as to whether a preferred call number is present that is identical to the destination call number (2). The service control point SCP contains a functional image of the charging device BC with respect to the online charging of the call, analogous to the description of FIG. 1 and FIG. 2. As acknowledgment, the mobile switching center MSC receives a message confirming that the destination call number SN0 was defined as a preferred call number and stored at the network side (3). The mobile switching center MSC then prompts the charging device BC to consider the preferred rate schedule PTAR when calculating the call charge (4). With the received destination call number SN0, the call connection is set up from the mobile switching center MSC to the destination DSTA of the wirebound subscriber, which is situated in the coverage area of the other network in this example. The charging device BC sends at least the information about the separate fee schedule PTAR back to the mobile switching center MSC (5). An acknowledgment signaling of the information AOC including the indication (e.g., consisting of the marker PNM) that a preferred handling is in effect between the network and mobile station MS, as in the example in FIG. 3, is provided so that the mobile subscriber is informed at least about the separately scheduled rate of his call or, additionally, about the accruing charges.

The number lists PNL and PNL* stored at the network side in the subscriber database IND of the intelligent network node SCP can be managed and controlled (i.e., modified, expanded) deleted or interrogated, either by the mobile subscriber via the subscriber-controlled input or by the network operator OP of the IN network or by the service provider SP of intelligent services (by a corresponding intelligent peripheral device) via a separate interface to the charging device BC or the management facility CCC. The subscriber lists PNL, PNL* can be influenced by the mobile subscriber via the subscriber-controlled input.

Figure 5:
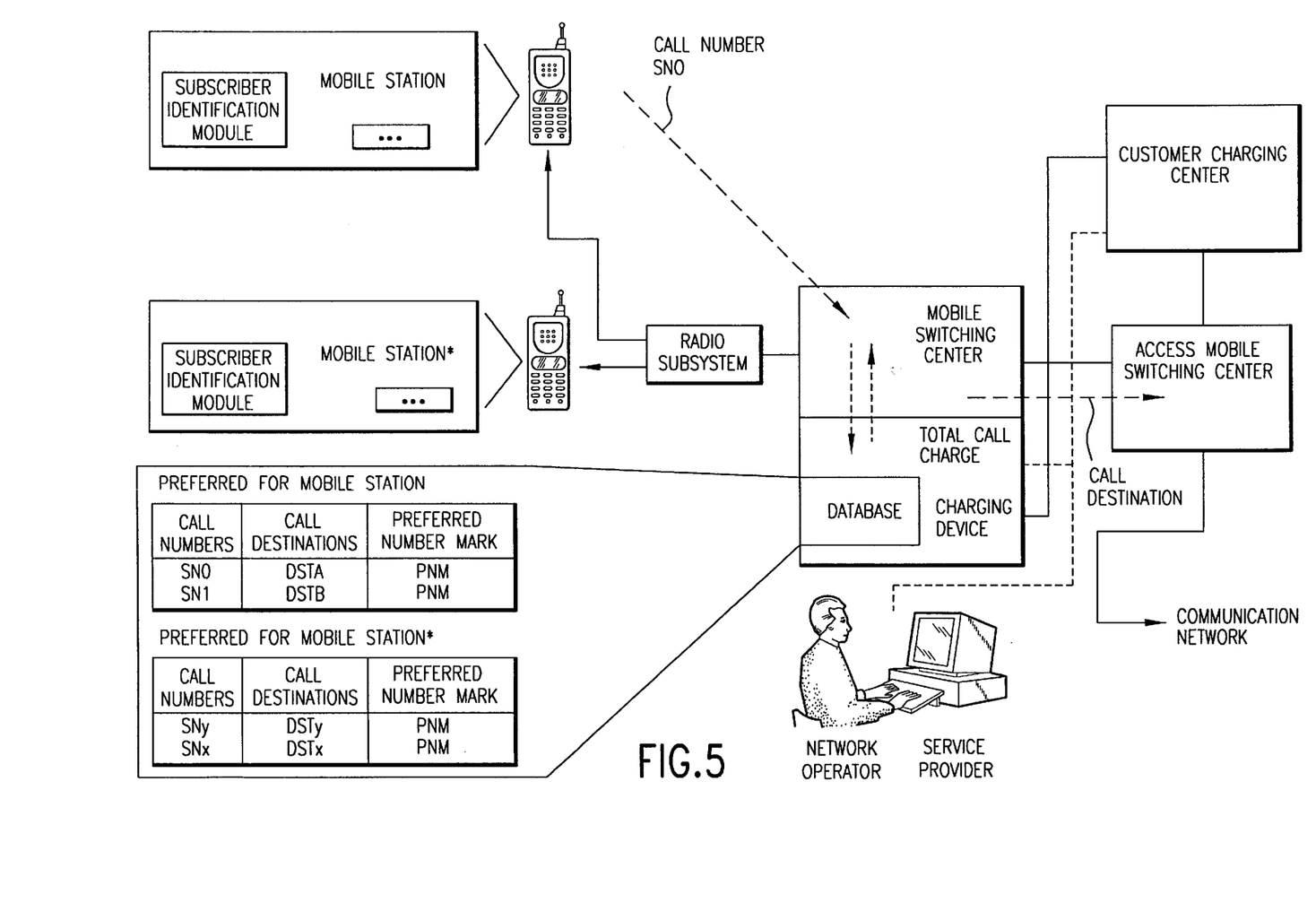
FIG. 5 illustrates the block circuit diagram of the mobile communication system for charging calls, given storing of the preferred call numbers at the network side in a message processing unit of the charging device.

The block circuit diagram according to FIG. 5 illustrates a further embodiment for storing the number lists PNL and PNL* for the mobile stations MS and MS* at the network side. The storage location is a database BCD of the charging device BC. The call of the A subscriber via the mobile station MS is handled as a conventional outgoing (i.e., the dialed destination call number SN0 is signaled to the network and evaluated by the mobile switching center MSC). Only in the charging device BC is it decided (with the aid of the number lists, which include the preferred call numbers and which are stored in the database BCD) whether to handle the call differently. A comparison of the stored destination call numbers in the list(s) PNL, PNL* to the signaled call number yields the positive result and due to the present preferred call number SN0, the other rate schedule PTAR is used for calculating the total call charge AMOU. Based on the destination call number SN0 received, the call connection is set up from the mobile switching center MSC to the call destination DSTA of the wirebound subscriber. The number lists PNL, PNL* that are read out during a postprocessing, which are stored at the network side in the charging device BC, can be managed and controlled (i.e., modified, expanded, deleted or interrogated)—by the network operator OP or the service provider SP via a separate interface to the charging device BC. The subscriber lists PNL, PNL* can be influenced by the mobile subscriber via the subscriber-controlled input.

Figure 6:
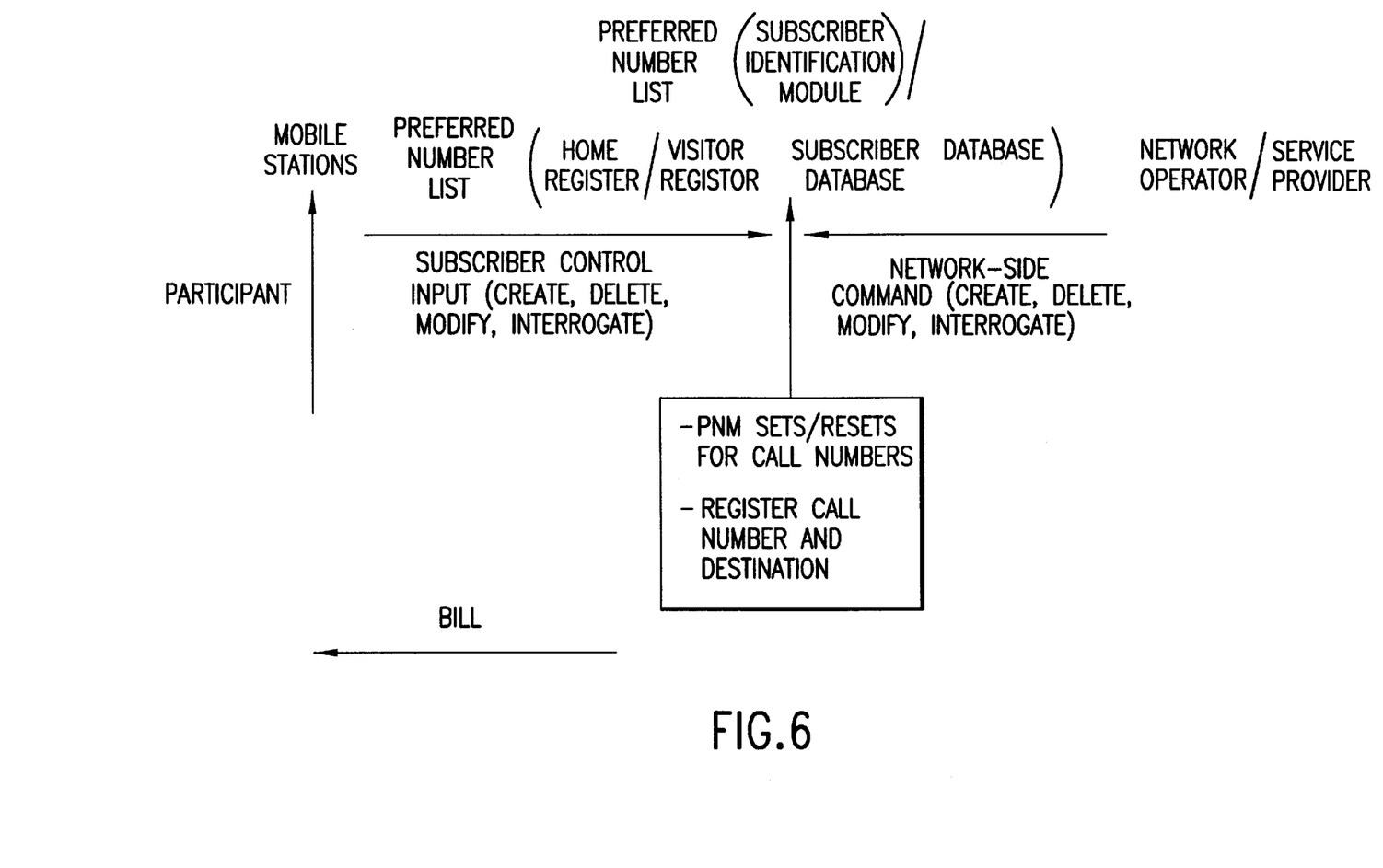
FIG. 6 illustrates the signaling from the mobile station or the network operator for access to the preferred call numbers stored at the mobile station side or at the network side.

FIG. 6 depicts the message flow for influencing the number list PNL—(representative of the number list PNL*)—on the side of the mobile stations MS and MS* by the subscriber himself, on one hand, and on the side of the network operator OP or the service provider SP, on the other hand. When the preferred call numbers are situated in the subscriber identification module SIM, the subscriber initiates a subscriber-controlled input, whereas network-side commands COM are initiated by the network operator OP or by the service provider SP. Regardless of which facility the control of the stored information occurs, the subscriber-controlled input SCI and the commands COM contain a "create" message for defining/establishing preferred numbers, a "delete" message for deleting the preferred call number, a "modify" message for modifying the preferred call numbers or an "interrogate" message for interrogating the preferred call numbers individually or as a whole. Based on the control messages that are received at the mobile station side or at the network side, the marker PNM is set/reset, for instance for the preferred call numbers SN0, SN1 or a new preferred call number SNz, potentially with the corresponding call destination DSTz, added to the existing list PNL. In case of controlling and managing by the subscriber himself, the action can also produce a bill that is computed at the network side.

While this invention has been described in connection with what are presently considered to be the most practical and preferred embodiments, it is to be understood that the invention is not limited to the disclosed embodiments but, on the contrary, is intended to cover various modifications and equivalent arrangements included within the spirit and scope of the appended claims.

What is claimed is:

1. A mobile communication system for charging calls that can be sent and received by mobile stations of mobile subscribers in a mobile radio network with a cellular network structure based on radio cells having a mobile station side and a network side, comprising:

radio equipment configured for sending and receiving at least one of signaling and payload information to and from the mobile stations;

switching equipment configured for switching at least one of signaling and payload connections between the network side and the mobile stations;

storage equipment for storing subscriber data of the mobile subscriber; and a charging device for recording call-related data records and calculating the respective call charge dependent on the data records;

wherein one or more preferred call numbers are respectively defined and managed for each of the mobile subscribers; and an item of control information is allocated to a destination call number that is dialed with a call in order to denote that the destination call number is a preferred call number, the destination call number is compared to the one or more preferred call numbers defined for the mobile subscriber, and when the destination call number is identical to a preferred call number, call charges are determined by the charging device in a prescribed manner different from normal call charges.

2. The mobile communication system as claimed in claim 1, wherein the preferred call numbers are stored at the mobile station side.

3. The mobile communication system as claimed in claim 2, wherein the preferred call numbers are stored in at least one of the mobile station and a subscriber identity module of the mobile station.

4. The mobile communication system as claimed in claim 2, wherein a memory entry is formed at least from the preferred call number and a corresponding call destination.

5. The mobile communication system as claimed in claim 4, wherein the memory entry contains a short code marking the preferred call number and a name of a called subscriber as the corresponding call destination.

6. The mobile communication system as claimed in claim 2, wherein the control information marking the presence of a preferred call number is signaled together with the destination call number from the mobile station to the mobile radio network and a subscriber-specific charging of the call is prompted based on the control information received.

7. The mobile communication system as claimed in claim 6, wherein information indicating at least the subscriber-specific charging of the call is held ready by the mobile radio network, signaled to the mobile station, and displayed to the mobile subscriber by the mobile station.

8. The mobile communication system as claimed in claim 6, wherein the control information marking the presence of a preferred call number is signaled to the mobile station and displayed.

9. The mobile communication system as claimed in claim 1, wherein the preferred call numbers are stored at the network side.

10. The mobile communication system as claimed in claim 9, wherein the preferred call numbers are stored in at least one subscriber database of the mobile radio network as subscriber data for the respective subscriber.

11. The mobile communication system as claimed in claim 10, wherein the preferred call numbers that are entered as subscriber data are managed by the network operator of the mobile radio network.

12. The mobile communication system as claimed in claim 9, wherein the preferred call numbers are stored in at least one subscriber database of a service control point of an intelligent network for the respective subscriber.

13. The mobile communication system as claimed in claim 12, wherein the preferred call numbers stored in the service control point are managed by the network operator of the intelligent network.

14. The mobile communication system as claimed claim 9, wherein the preferred call numbers are managed by the mobile station via a subscriber-controlled input.

15. The mobile communication system as claimed in claim 14, wherein the subscriber-controlled input for managing the preferred call numbers is charged to the subscriber separately.

16. The mobile communication system as claimed in claim 9, wherein the preferred call numbers are managed via signaling messages that initiate at least one of an adding of new preferred call numbers, a removing of stored preferred call numbers, a modifying of stored preferred call numbers and an interrogating of the stored preferred call numbers.

17. The mobile communication system as claimed in claim 1, wherein the preferred call numbers are stored in the charging device at the network side and the presence of a preferred call number is first taken into consideration only when the data records are linked for purposes of calculating the call charge.

18. A mobile station for sending and receiving calls of mobile subscribers in a mobile radio network having a cellular structure that is based on radio cells, the radio network comprised of radio equipment for sending and receiving at least one of signaling and payload information to and from the mobile station, switching equipment configured for switching at least one of signaling and payload connections between the network side and the mobile stations, storage equipment for storing subscriber data of the mobile subscriber; and a charging device for recording call-related data records and calculating the respective call charge dependent on the data records, the mobile station comprising:

a control and management unit configured for respectively defining and managing one or more preferred call numbers for each of the mobile subscribers;

a comparison unit configured for comparing a destination call number that is dialed with a particular call to the preferred call numbers, the destination call number having an item of control information allocated thereto to denote that the destination call number is a preferred call number; and a receiving/transmitting unit that is configured to signal the item of control information marking the presence of a preferred call number to the mobile radio network together with the destination call number when the destination call number is identical to preferred call number; wherein call charges within the mobile radio network are calculated by the charging device in a prescribed manner different from normal call charges.

19. The mobile station as claimed in claim 18, wherein the preferred call numbers are stored in at least one of the mobile station and a subscriber identification module of the mobile station.

20. The mobile station as claimed in claim 18, wherein a memory entry is formed from the preferred call number and at least one corresponding call destination.

21. The mobile station as claimed in claim 20, wherein the memory entry contains a short code marking the presence of the preferred call number and a name of a called subscriber as the corresponding call destination.

22. The mobile station as claimed in claim 18, wherein the control information marking the presence of a preferred call number is signaled together with the destination call number to the mobile radio network and a subscriber-specific charging of the call is prompted based on the control information received.

23. The mobile station as claimed in claim 18, wherein information indicating at least the subscriber-specific charging of the call is received by the mobile radio network and is displayed and reported by the mobile station via at least one of optical and acoustical means.

* * * * *